United States Patent [19]

Uzunoglu et al.

[11] 4,169,286
[45] Sep. 25, 1979

[54] SURFACE ACOUSTIC WAVE UNIQUE WORD DETECTOR AND COHERENT DEMODULATOR

[75] Inventors: Vasil Uzunoglu, Ellicott City; Chester J. Wolejsza, Jr., Gaithersburg, both of Md.

[73] Assignee: Communications Satellite Corporation, Washington, D.C.

[21] Appl. No.: 914,108

[22] Filed: Jun. 9, 1978

[51] Int. Cl.$^2$ .......................... H04Q 9/14; H03H 9/20
[52] U.S. Cl. ..................................... 364/821; 310/313; 325/55; 333/193; 364/861
[58] Field of Search ............... 364/728, 819, 821, 861; 325/55, 64, 324; 340/311; 333/30 R, 72; 310/313

[56] References Cited

U.S. PATENT DOCUMENTS

| Re. 29,525 | 1/1978 | Willmott | 325/55 |
|---|---|---|---|
| 3,551,837 | 12/1970 | Speiser et al. | 333/72 |
| 3,626,309 | 12/1971 | Knowles | 333/72 |
| 3,810,257 | 5/1974 | Jones et al. | 333/72 |
| 3,818,348 | 6/1974 | Puente | 325/324 |
| 3,980,962 | 9/1976 | Scotter | 333/72 |
| 4,037,201 | 7/1977 | Willmott | 325/55 |

*Primary Examiner*—Felix D. Gruber
*Attorney, Agent, or Firm*—Sughrue, Rothwell, Mion, Zinn and Macpeak

[57] ABSTRACT

A surface acoustic wave device is used as a unique word detector and coherent demodulator for a digital code differential phase-shift signal. The device improves code word detection by providing a coherent reference with a correlation gain of 10 log M dB. M is the additional number of fingers introduced into the surface acoustic wave device, which determine the phase of the unique word. To achieve this result with higher reliability and higher correlation coefficient, use is made also of a few bits of the clock recovery which precede the unique word in a preamble as used in Time Division Multiple Access (TDMA) systems. The device requires two interdigital output transducers, one of which provides a maximum output in response to surface acoustic waves representing the unique word, and the other of which provides a maximum output in response to surface acoustic waves corresponding to a preassigned pattern of the unique word, such as a sequence of all zeros combined with a partial sequence of the clock recovery bits. The outputs of the two interdigital output transducers are maximized at the same instant to detect the auto-correlation peak of the unique word with performance equivalent to coherent demodulation. Also, clock and data are recovered in the second set of interdigital transducers.

3 Claims, 5 Drawing Figures

SURFACE ACOUSTIC WAVE UNIQUE WORD DETECTOR AND COHERENT DEMODULATOR

BACKGROUND OF THE INVENTION

The present invention generally relates to Surface Acoustic Wave (SAW) devices, and, more particularly, to the application of such devices to a unique word detector and coherent demodulator for a digital code differential phase-shift signal. Such a detector and demodulator has particular application in communications systems, and the use of the present invention results in an improvement in the unique word error rate (UWER), with a simpler structure.

It is common in TDMA communications systems to transmit a frame of data preceded by a preamble. The preamble typically includes a clock recovery sequence, a unique word and various housekeeping signals. A "unique word" is a digital word having a minimum of ten symbols and exhibiting high auto-correlation properties. Detection of the unique word is used for frame synchronization.

SAW devices have been used for performing numerous functions, such as bandpass filters, correlators, coders, decoders, modulators and the like, at radio frequencies between 10 M bit and 1 G bit. A unique word detector can be implemented in a straightforward manner with SAW technology. The fingers of the interdigital output transducer are arranged in a pattern corresponding to the unique word to be detected. In other words, the interdigital output transducer is phase-coded to have an impulse response equal to the time inverse of the unique word differential phase-shift signal waveform. A sharp correlation peak occurs when the unique word signal just fills the phase-coded output transducer. When implemented in this manner, the SAW device is a differential non-coherent decoding element—that is, it has 0° and 180° phase shifts at each finger point, depending on its location, without being able to identify the absolute phase. In other words, the SAW device, used as a unique word detector, will detect not only the unique word but its inverse as well without discriminating between the two. This is, of course, undesirable in a TDMA communication system because of data decoding errors resulting from failure to properly detect the unique word and establish frame synchronization. In addition, the inverse word is often used for "superframe" synchronization.

SUMMARY OF THE INVENTION

The SAW device of the present invention improves unique word detection by providing a coherent reference with an improvement in the correlation gain of 10 log M dB. M is the additional number of fingers introduced into the SAW device. More particularly, the SAW device, according to the present invention, includes at least two interdigital output transducers, both positioned to intercept surface acoustic waves launched by an input transducer. The first interdigital output transducer is formed with a first group of fingers arranged to provide a maximum output in response to surface acoustic waves representing the unique word or its inverse. In addition, the first output transducer is formed with a second group of fingers arranged and summed in a predetermined pattern of several bits of the clock recovery sequence. The second output transducer produces a maximum output at the same instant in time when the first output transducer produces a maximum output in response to surface acoustic waves representing the unique word. The signal at the output of the second transducer provides a coherent reference which is used to detect the auto-correlation peak of the unique word, with performance equivalent to coherent demodulation. For large M, the performance improvement approaches 3 dB. In addition, the present invention may be used to provide both clock recovery and differentially decoded data outputs. A threshold detector with positive reference provides the true unique word detection, while a threshold device with negative reference provides the inverse unique word detection.

BRIEF DESCRIPTION OF THE DRAWINGS

The present invention will be better understood from the following detailed description with reference to the accompanying drawings, in which.

DETAILED DESCRIPTION OF THE INVENTION

Figure 1:
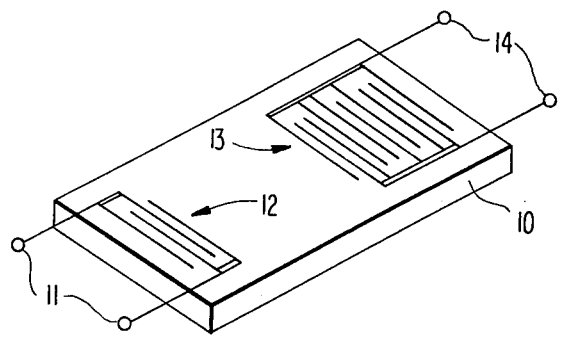
FIG. 1 is a perspective view of a prior art SAW device designed to detect a 5-bit unique word.

The SAW device illustrated in FIG. 1 comprises a piezoelectric substrate 10 having a polished, planar surface. The most widely used piezoelectric materials for SAW devices include quartz, $LiNbO_3$, $Bi_{12}GeO_2$ and $LiTaO_3$. These materials are suitable for the device according to the present invention; however, it should be understood that the practice of the invention is not limited to these particular piezoelectric materials. An input signal is applied to the input terminals 11 which are connected to an interdigital input transducer 12 on the planar surface of the substrate 10. The transducer 12 comprises a pair of metal film electrodes, each comprising a set of fingers extending from a metallized area connected to a respective one of the input terminals 11. The fingers of the two electrodes are interdigitated in parallel-spaced relationship in a well-known manner. The metal electrodes of the input transducer 12 may be, for example, gold plated on the planar surface of the substrate 12 using standard photolithographic techniques. When a sinusoidal electrical voltage is applied to the input terminals 11 of the device, the electrical field between adjacent fingers of the input transducer 12 fringes into the substrate, producing an alternating strain field and, consequently, an acoustic wave. Acoustic waves propagate away from the transducer along the surface in both directions perpendicular to the fingers. The forward propagating wave which is generated by the input transducer is partially converted to an electrical signal at the output transducer 13 by the inverse piezoelectric effect. Waves propagating in the reverse direction from the input transducer 12 or propagating past the output transducer 13 are damped by acoustic absorbing material (not shown) as is conventional. The output transducer 13 is similar in construction to the input transducer 12, and comprises a pair of metal film electrodes, each comprising a set of fingers extending from metallized areas which are respectively connected to output terminals 14. The fingers of output transducer 13 are interdigitated in parallel-spaced relation, but the pattern of interdigitation is modified to produce a phase-coded array corresponding to the unique word which is to be detected.

Figure 2:
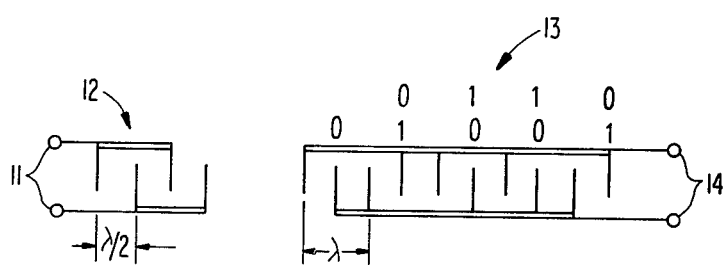
FIG. 2 is a schematic plan view illustrating the geometry and relative dimensions of the input and output transducers of the SAW device shown in FIG. 1.

As is shown in FIG. 2, the spacing between adjacent fingers in each of the input and output transducers is $\lambda/2$ where $\lambda$ is equal to the surface wavelength of the input phase-coded signal. FIG. 2 also shows the code word corresponding to each finger element of the output transducer 13. The data 01001 corresponds to a 5-bit unique word sequence, and the data 10110 is the complement of the unique word sequence and is detected as an equally correlated data with opposite phase.

As will be appreciated from FIG. 2, the output transducer 13 has two finger pairs for each bit in the unique word. The geometry of the finger pairs is such that the output transducer provides a maximum envelope output in response to a predetermined pattern of phase changes rather than a predetermined pattern of absolute phase coding.

To better illustrate the problem of the prior art SAW unique word detector, assume, for example, that a 16-bit unique word is to be detected. This requires an output transducer having 16 pairs of fingers, or 32 fingers, as the decoding element. When a matched condition for all 16 bits prevails, the output will be maximum. For purposes of illustration, this amplitude will be assumed to be 16 units high. When a 15-bit matched condition prevails, the output drops by 2 units—that is, the output becomes 14 units high—and this trend continues until the output becomes 0 at the 8-bit matched condition. At the 7-bit matched condition, the output envelope starts to increase again so that at the 0 matched condition, which corresponds to the inverse of the unique word to be detected, the output becomes 16 units high again. The output of a 16-bit SAW unique word detector versus the number of matched bit conditions is graphically shown in FIG. 3.

Figure 4:
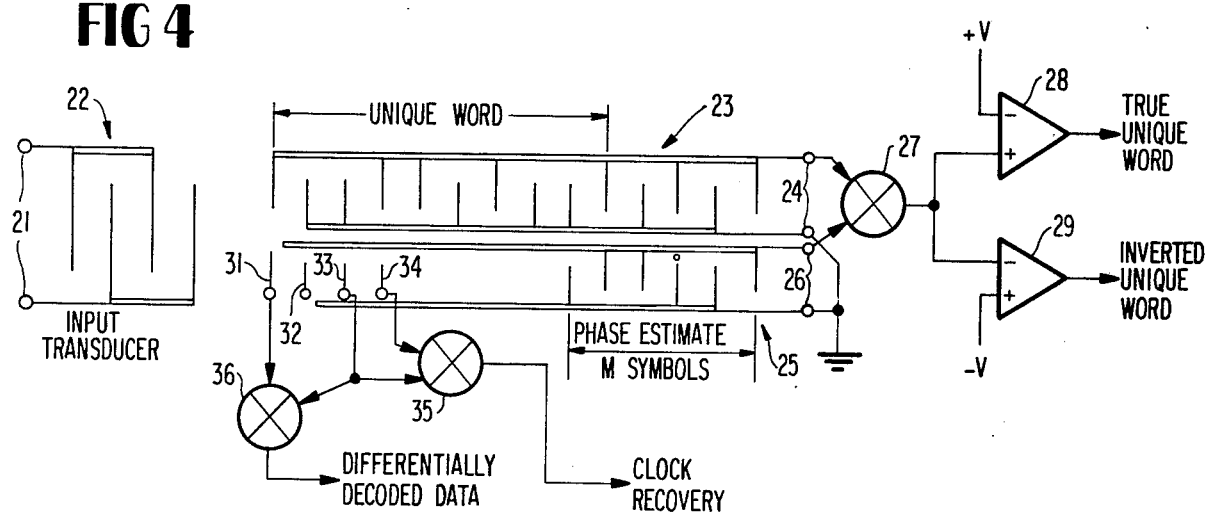
FIG. 4 is a plan view and block diagram of an exemplary preferred embodiment of the SAW device according to the present invention.

The SAW device according to the invention is shown in FIG. 4, and comprises input terminals 21 connected to an input transducer 22. The input transducer 22 is similar to the input transducer 12 of the device as shown in FIGS. 1 and 2, except that it is extended transversely of the direction of acoustic wave propagation to cover not only the output transducer 23 for detecting the unique word but also an output transducer 25 for providing an estimation of absolute phase. The output transducer 23 is like the output transducer 13 in the device of FIGS. 1 and 2 but with the addition of two finger pairs in an alternating sequence. In other words, the output transducer 23 illustrated in FIG. 4 is comprised of a first group of interdigitated fingers arranged in a pattern corresponding to the unique word to be detected, and a second group of interdigitated fingers in an alternating sequence corresponding to a clock recovery pattern. Those skilled in the art will understand that the clock recovery sequence usually precedes the unique word in the preamble of a communications data frame. In the specific example given, the unique word is defined as 01001 so that the preceding clock sequence will be 01, reading from left to right. Transducer 25 comprises three pairs of fingers, two of which are responsive to the alternating clock sequence of 01 and one is responsive to the first bit of data which is 1. Thus, the second group of fingers maximizes to 101. In operation, the output of both transducers 23 and 25 are maximized at the same instant. Transducer 23 has a maximum output in response to a SAW corresponding to the unique word, whereas transducer 25 has a maximum output when the SAW according to the M-phase estimate symbols, part of which precede the unique word, passes the fingers of transducer 25. The delays in the SAW device are controlled by appropriate placement of the fingers of each of the transducers 23 and 25 such that these maximums occur at the same instant of time.

The signal at the output of transducer 25 provides a coherent reference which is used to detect the auto-correlation peak of the unique word at the output of transducer 23. More particularly, the lower one of the output terminals 24 of the transducer 23 is connected to the lower one of the output terminals 26 of transducer 25 to a common reference potential or ground. The upper one of each of the output terminals 24 and 26 is connected to a mixer 27, which provides an output having an amplitude equal to the product of the amplitudes at each of the output terminals 24 and 26 and an algebraic sign dependent on the relative phase of the two signals. The output of mixer 27 is connected to the positive input of an operational amplifier 28, which has its negative input terminal connected to a source of positive reference voltage $+V$. Thus, the operational amplifier 28 does not provide a positive output unless the output of mixer 27 exceeds the reference voltage $+V$. Diode clamping circuits can be provided in a manner well known in the art so that the operational amplifier 28 provides an output only when this reference voltage $+V$ is exceeded by the output of mixer 27 so that the combination of the mixer 27 and the operational amplifier 28 performs the function of a threshold detector having a coherent reference. Should it also be desired to detect the inverted unique word, a second operational amplifier 29 can be provided with its negative input connected to the output of mixer 27 and its positive input connected to a source of negative reference potential $-V$.

Figure 3:
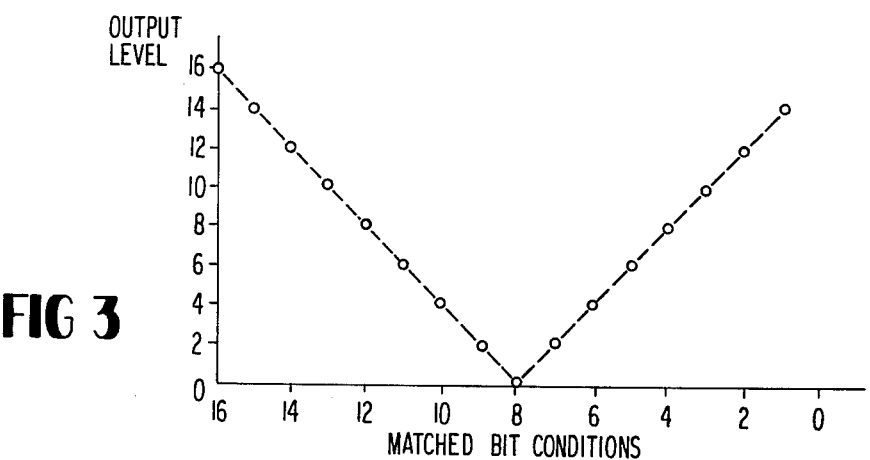
FIG. 3 is a graph illustrating the output of a conventional 16-bit SAW device versus the number of matched bit conditions.
Figure 5:
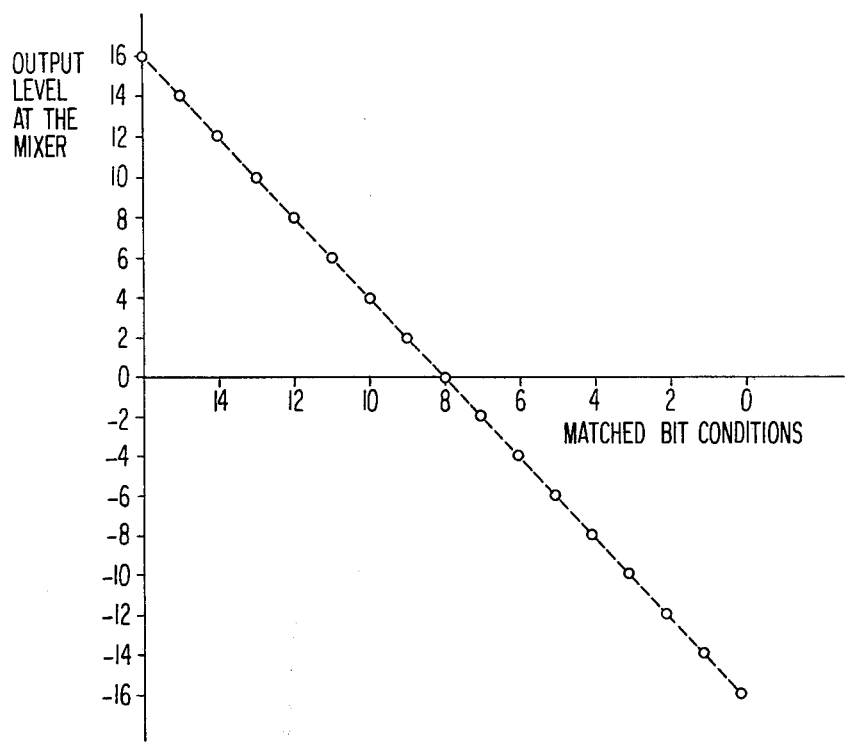
FIG. 5 is a graph illustrating the output of a 16-bit SAW device according to the present invention versus the number of matched bit conditions.

The output of the present coherent detector can be described as in FIG. 5, where the detection line of FIG. 3 extends now into the negative direction, identifying also the inverse unique word. A SAW unique word detector with N number of finger pairs has a correlation gain of 10 log N dB. In the example illustrated in FIG. 4, N=5, and this is the least number of bits which will define a unique word. The estimation of absolute phase should have a similar correlation gain so that the correlation advantage obtained from the estimation of the unique word is similarly reflected to the estimation of phase. Practical limitations may prevent the realization of N phase pairs. Thus, it may be necessary to confine to M the possible estimation pairs where M<N. In such a case, the absolute phase correlation gain will be limited to 10 log M dB, and the overall correlation advantage will be a function of M. In the example illustrated in FIG. 4, M is equal to 3, two of which are supplied by the clock recovery sequence and one by the unique word. The choice of N and M will depend on the application to which the invention is put as well as physical limitations of the SAW device itself. It should be noted that for sufficiently large M, the unique word error rate approaches coherent detection performance which is 3 dB better than prior art non-coherent detection.

According to another feature of the invention, additional fingers 31, 32, 33 and 34 are provided. The distance between these fingers is $\lambda/2$ as in the output transducers 23 and 25, but they are not connected together. Fingers 31, 32, 33 and 34 are totally independent. By means of these additional fingers, in association with external circuitry, it is possible to both recover the clock and differentially decode the data. More specifically, fingers 33 and 34, which may be considered to be a separate output transducer, are connected to the input of mixer 35 to provide a clock recovery output. In addition, fingers 31 and 33, which together with finger 32 may be considered yet another output transducer, are connected to the inputs of a mixer 36 which provides a differentially-decoded data output.

A frame of information as represented by a signal applied to the input terminals 21 of the input transducer 22 typically comprises a preamble followed by a data block, and the preamble is composed of a clock recovery sequence followed by the unique word. Therefore, the output transducer comprising the fingers 33 and 34 initially provides inputs to the mixer 35 for purposes of clock recovery. In other words, the local clock is synchronized using the initial clock recovery sequence in the transmitted frame. The SAWs launched by the input transducer continue to propagate on the substrate, and, at some point in time, the SAWs corresponding to the unique word are under the decoder section of output transducer 23. At the same instant of time, the SAWs corresponding to the clock recovery sequence have progressed to the point that they are under the output transducer 25. As a result, maximum outputs are provided at output terminals 24 and 26. The sum of these outputs provided at the output of mixer 27 exceeds the threshold established at the operational amplifier 28 to provide a detection of the unique word. This identifies the beginning of the data block, and, at this point in time, the output of mixer 36 can be accepted as the differentially-decoded data. This can be easily accomplished by using the output of operational amplifier 28 to enable a gate circuit (not shown) to pass the output of mixer 36.

It will be understood by those skilled in the art that the invention has been described in terms of a simple, preferred embodiment, and that modifications can be made within the scope of the invention. Obviously, the number M of the finger pairs used in the phase estimate decoder of the output transducer 25 and the number N of the finger pairs used in the unique word decoder section of output transducer 23 can be changed from the specific example given, depending on the particular application and physical limitations. Moreover, depending on the specific application, clock recovery and/or differential decoded data outputs may not be required.

We claim:

1. A coherent unique word detector and differential demodulator for a digital code differential phase-shift signal comprising:
    a piezoelectric crystal substrate having a planar surface;
    an interdigital input transducer on the planar surface of said substrate for launching onto said substrate surface acoustic waves;
    a first interdigital output transducer on the planar surface of said substrate positioned to intercept surface acoustic waves launched by said input transducer, and having a first group of fingers arranged to provide a maximum output in response to surface acoustic waves representing a predetermined unique word or its inverse, and a second group of fingers arranged in a predetermined alternating sequence, said second group of fingers being further from said input transducer than said first group of fingers;
    a second interdigital output transducer on the planar surface of said substrate positioned to intercept surface acoustic waves launched by said input transducer, and having a group of fingers arranged in said predetermined alternating sequence and positioned with respect to said input transducer to provide a maximum output in response to surface acoustic waves representing a coherent reference at the same instant in time as a maximum output is provided by said first interdigital output transducer in response to surface acoustic waves representing said predetermined unique word; and
    threshold means connected to said first and second interdigital output transducers for detecting the auto-correlation peak of said predetermined unique word as represented by a maximum output from said first interdigital output transducer using the maximum output of said second interdigital output transducer as a coherent reference.

2. A coherent unique word detector and differential demodulator as recited in claim 1 further comprising:
    a third interdigital output transducer on the planar surface of said substrate positioned to intercept surface acoustic waves launched by said input transducer, and having two fingers separated by one-half wavelength of said surface acoustic waves, said third interdigital output transducer being closer to said input transducer than said second interdigital output transducer; and
    clock detector means connected to said third interdigital output transducer for providing a recovered clock signal derived from said surface acoustic waves representing a coherent reference.

3. A coherent unique word detector and differential demodulator as recited in claim 2 further comprising:
    a fourth interdigital output transducer on the planar surface of said substrate positioned to intercept surface acoustic waves launched by said input transducer, and having two fingers separated by one wavelength of said surface acoustic waves; and
    data detector means connected to said fourth interdigital output transducer for providing a decoded data signal derived from surface acoustic waves occurring subsequent in time to said surface acoustic waves representing a predetermined unique word.

* * * * *